United States Patent Office 3,182,040
Patented May 4, 1965

3,182,040
AMIDE-CURED CARBOXYL-TERMINATED PREPOLYMERS
Nathaniel L. Watkins, Jr., Maplewood, and Richard M. McCurdy, East Oakdale Township, Washington County, Minn., assignors to Minnesota Mining and Manufacturing Company, St. Paul, Minn., a corporation of Delaware
No Drawing. Filed Apr. 2, 1959, Ser. No. 803,577
13 Claims. (Cl. 260—75)

This invention relates to resinous compositions and more particularly to polymers cured by means of certain polyfunctional amide-containing monomers.

This application is a continuation-in-part of our prior copending application Serial No. 668,038, filed June 26, 1957.

Processes for converting liquid polymers to solid elastomers or rubbers are of course well known. The elastomeric properties of polymers depend essentially upon the "backbone" of the system and upon the molecular weight. In order to assure adequate strength and elongation in a rubber, it appears to be essential that the curing of the liquid polymer which forms the starting material for the preparation of that rubber be accomplished chiefly by the method of chain-extension rather than by random cross-linking. This is true because the chain-extension method connects reactive end groups together, thus increasing primary molecular weight and creating a larger regular molecule composed of smaller units. In random cross-linking, however, the units in the final polymer molecule are not so regularly spaced and contain many loose ends (not terminally connected) which plasticize the molecule rather than add to its strength. On the other hand, bringing about polymerization of liquid polymers by the method of chain-extension preserves the essential elastomeric character of the final polymer and enables great strength and a high degree of elongation to be "built into" the resulting polymer.

Heretofore, three types of rubber have been produced from liquid prepolymers by the method of chain-extension. These substances include the polysulfide elastomers, polyesters and polyethers cured with diisocyanates, and carboxyl-terminated polyesters which have been chain-extended with diepoxide resins. Generally speaking, however, all three types of elastomers and the methods for their preparation have inherent disadvantages. Thus, for example, the polysulfide rubbers are relatively unstable with respect to their mechanical properties, particularly at elevated temperatures. Systems cured with isocyanates are sensitive to moisture during preparation and in addition, the isocyanate components have very irritating physiological effects. During curing, the formation of gas and consequent sponging of the composition is commonly observed and is obviously disadvantageous. The resulting rubbers soften severely at elevated temperatures and have very poor adhesion to metals when cured. Polyester resin chain-extensions with di-epoxide resins require relatively long curing times at elevated temperatures and the resulting rubbers are rather stiff with poor elastomeric properties.

In spite of all of the shortcomings of the systems named and because of the great need for liquid elastomers which can be cured to produce dense solvent-proof masses with moderate strength and extensibility, desirably within a period of from about one to four days after application, such substances have found considerable use in the past, particularly in the field of sealants in the construction of aircraft.

It is an object of the invention to provide liquid compositions capable of forming elastomers, which can be cured at low temperatures and which when cured produce elastomers having superior heat stability and solvent resistance together with good flexibility at low temperature. Another object of the invention is to provide fabric-coating compositions. Further objects of the invention will be apparent from the disclosure hereinafter made.

In accordance with the above and other objects of the invention it has been found that when certain polycarboxyl group-containing prepolymers are cured with the hereinafter-defined polyfunctional ethylenimine derivatives, elastomers are produced which have highly advantageous properties. They have a high degree of heat-stability while retaining desirable mechanical and chemical properties at high temperature. They have excellent solvent resistance and are very flexible at low temperature. They are relatively insensitive to moisture and can in most instances be mixed and compounded in simple, open mixing equipment rather than closed containers and ball mills; and they may be cast in inexpensive open molds, rather than high pressure and/or high temperature molds. When thus cast, they may be cured at surprisingly low temperatures, often at room temperature and when so cured, they are remarkably free from gas formation; yet they have useful pot life in spite of their low temperature curing properties. No significant toxicity problem appears to arise in connection with their production. The systems are characterized further by requiring no solvents, so that they can be prepared as mixtures containing 100% solids-forming components. When coated on fabrics for use in lightweight tarpaulins, radomes, electrical insulation, collapsible storage and shipping containers, protective clothing, upholstery, etc., they form tough, flexible coatings which are superior to the presently used neoprene and vinyl fabric coatings in both low temperature flexibility and in abrasion resistance.

Prepolymers which are suitable for use in the present invention can be of any of several classes of carboxyl-terminated polyester-type (oxygen-linked) polymers and carboxyl-containing vinyl-type polymers, which can be more particularly defined as follows:

I. Branched polyesters may be prepared from a polyfunctional alcohol, one or more diols and one or more dibasic acids. Some examples of these polyesters are the reaction products of—

Glycerol, 2,2-dimethyl-1,3-propanediol and succinic acid;
Trimethylolpropane, diethylene glycol, and adipic acid;
Trimethylolpropane, neopentyl glycol and diglycolic acid;
Glycerol, diethylene glycol, and adipic acid;
Trimethylolpropane, polyethylene glycol and thiadipropionic acid;
Trimethylolethane, diethylene glycol, polyethylene glycol and oxydipropionic acid;
Trimethylolpropane, 2,2-bis[4-(2-hydroxypropoxy)phenyl]-propane and azelaic acid;
Mannitol, diethylene glycol and diglycolic acid;
Pentaerythritol, propylene glycol, sebacic acid, and isophthalic acid; and
Trimethylolpropane, 3 - methyl-3 - azapentandiol-1,5 and azelaic acid.

Branched polyesters may also be prepared from a polyfunctional acid, one or more diols and one or more dibasic acids. Some examples of these polyesters are the reaction products of—

Trimesic acid, diethylene glycol and adipic acid;
Citric acid, polyethylene glycol and adipic acid;
Citric acid, di-1,4-(2-hydroxypropoxy)benzene, fumaric acid and sebacic acid;
Benzene tetracarboxylic acid, propylene glycol, 1,4-butylene glycol and adipic acid;
Benzene tetratcarboxylic acid; polyethylene glycol, and maleic acid; and Benzene tetracarboxylic acid; 2,2-diethyl 1,3-propanediol, and diglycolic acid.

A further method of preparing branched polyesters is by reacting a polyfunctional acid with a hydroxy or an amino acid. Some examples of these polyesters are the reaction products of—

Benzene tetracarboxylic acid and 12-hydroxy stearic acid;
Benzene tetracarboxylic acid and N-methyl β-alanine;
Polyacrylic acid and hydracrylic acid;
Polyacrylic acid and N-methyl-omega-aminoundecanoic acid;
Polymethacrylic acid and N-methyl-6-amino caproic acid.

II. Dianhydride-extended polyesters: Some examples are the reaction products of—

A linear, hydroxyl-terminated polydiethylene glycol adipate extended with pyromellitic dianhydride;
A linear, hydroxyl-terminated polyester of 1,4-butylene glycol and diglycolic acid extended with 1,4,5,8-naphthalenetetracarboxylic dianhydride; and
A linear, hydroxyl-terminated polyester of polypropylene glycol and isophthalic acid extended with cyclohexanetetracarboxylic dianhydride.

III. Anhydride-extended polyether glycols: Some examples are the reaction products of dianhydrides with polyether glycols such as—

Pyromellitic dianhydride and polybutylene glycol;
1,4,5,8-naphthalenetetracarboxylic dianhydride and polypropylene glycol; and
Cyclohexanetetracarboxylic dianhydride and poly 3-methyl-1,4-butylene glycol.

Anhydride-extended polyether glycols may also be prepared from branched polyether alcohols and cyclic acid anhydrides. Some examples are the reaction products of—

The reaction product of propylene oxide and ethylene diamine with glutaconic anhydride;
The reaction product of pentaerythritol with ethylene and propylene oxide with maleic anhydride; and
A glycerine, ethylene oxide, propylene oxide reaction product of the formula

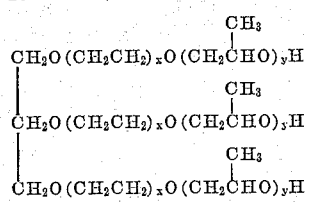

and succinic anhydride, wherein $x$ is a number from 1 to about 20 and $y$ is a number from 1 to about 100.

IV. Acrylic addition copolymers: Some examples are copolymers of— acrylic acid and butadiene;
and partially hydrolyzed copolymer of maleic anhydride and butyl acrylate;
butyl acrylate, 2-cyanoethyl acrylate and acrylic acid;
methacrylic acid and butadiene;
acrylic acid and isoprene;
acrylic acid and chloroprene;
methacrylic acid and isoprene;
cinnamic acid and butadiene;
crotonic acid and butadiene;
acrylic acid and methoxyethyl acrylate;
and acrylic acid, acrylonitrile and butadiene.

The carboxyl group-containing prepolymers which are cured by the method of the invention are further characterized by being substantially liquid at about 25° to 50° C. when devoid of volatiles (i.e. have a maximum viscosity of the order of about 10,000 poises), have an acid content ranging from about 0.1 to about 3 milliequivalents per gram, and contain an average of more than 2 carboxyl groups per molecule. It is preferable that these carboxyl group-containing prepolymers have viscosities of less than 1,000 poises at 25° C., acid contents of from about 0.25 to about 1.5 milliequivalents per gram, contain an average of from 2.5 to about 15 carboxyl groups per prepolymer molecule and have a number average molecular weight ($\overline{M}_n$) of between about 700 and 10,000. While they may contain free hydroxyl groups, the presence of such hydroxyl groups in the prepolymers is in general detrimental for the purposes of the invention because they can undergo ester interchange reactions, causing a chemical stress relaxation in the cured rubber. Preferably, the prepolymers used are substantially free from unreacted hydroxyl groups.

As noted, the prepolymers of the present invention are ordinarily liquid, 100% solids forming resins of which the maximum viscosity is of the order of 10,000 poises (less than 1,000 poises preferred). The advantages of such limitations on the prepolymer are:

(1) Little or no shrinkage upon final curing.

(2) The liquid form of these polymers is important in compounding and molding, i.e. simple mixing equipment may in most instances be used in place of ball mills and simple open molds may be used in place of high pressure and/or high temperature molds.

(3) The liquid form of the prepolymers makes it more simple to disperse the curing agent into the polymer itself. Bis-amides of the invention are soluble in or can be dispersed in the prepolymers. It is also possible when desired to put solid bis-amide curing agents into solution with volatile solvents such as chloroform and mix this solution with the prepolymer. The solvent may then be removed as by evaporation.

(4) No gases are given off during curing, whereby bubble-free resins are obtained.

(5) Strong, solvent-resistant rubbers can be formed in situ in difficultly accessible spaces, and the like.

The level of the acid concentration of the prepolymer as specified is limited to from between 0.1 and 3.0 milliequivalents per gram (the preferred range being 0.25 to 1.5 milliequivalents per gram), because the rate of the reaction between the prepolymer and the curing agent depends upon the concentration of free carboxyl groups available. For example, in certain applications, a curing time of about 2 to 4 days is most desirable. A level of fewer than 0.1 milliequivalent per gram acid concentration is practically inoperative to produce the desired result. On the other hand, if the upper acid concentration limit of 3.0 milliequivalents per gram is exceeded, control of the reaction may be lost, resulting in over-heating, charring, and even fire. The higher acid concentrations also reduce pot life or working time to an unfeasible minimum.

When referring herein to "carboxyl," "carboxyl groups" or "free carboxyl groups," it is intended to mean carboxylic acid reactive groups. It will be obvious that in the case of vinyl-type polymers, the carboxyl groups may not be terminal in exactly the same sense as in polyester-type polymers. However, it is considered that in the former case at least a number of the carboxyl groups present are located near chain ends.

The individual molecules of liquid prepolymer must, as stated, contain an average of more than two free carboxyl groups and may contain up to about fifteen carboxyls per molecule. By including more than two free carboxyl groups per chain length, a cured composition is produced, which no longer is capable of viscous flow. The presence of more than fifteen carboxyl groups in the prepolymer molecule unduly shortens the pot life or working time after the curing agent is added. The term "a cured polymer" as used herein implies that the system under discussion falls within the gelation equation concept of Flory ("The Principles of Polymer Chemistry," P. J.

Flory, Cornell Press, Ithaca, N.Y., 1953, pages 347 to 397).

The curing agents employed in preparing the polymers of the invention are substituted bis-alkylene amides (for convenience, sometimes herein to as "bis-amides") represented by the formula:

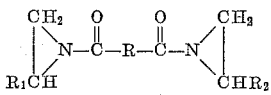

wherein R represents a member of the group consisting of alkylene radicals having from 6 to 18 carbon atoms, the 1,3-phenylene radical and the 1,4-phenylene radical, and $R_1$ and $R_2$ each represent hydrogen or a lower alkyl radical, i.e. having from 1 to 4 carbon atoms.

The specific curing agents included within the scope of the above formula are characterized by properties which permit storage without spontaneous polymerization. They are controllably reactive to form useful homopolymers, and are especially useful for the purpose of chain extension of carboxyl group-containing preploymers as disclosed herein.

Among the N,N'-bis-1,2,-alkylenamides useful as curing agents in accordance with the invention are N,N'-bis-1,2-ethylenisosebacamide;
N,N'-bis-1,2-butylenisosebacamide;
N,N'-bis-1,2-ethylensebacamide;
N,N'-bis-1,2-ethylensuberamide;
N,N'-bis-1,2-propylensuberamide;
N,N'-bis-1,2-butylensuberamide;
N,N'-bis-1,2,-ethylenazelaamide;
N,N'-bis-1,2-propylenazelaamide;
N,N'-bis-1,2-butylenazelaamide;
N,N'-bis-1,2-ethylendodecanoyldicarboxylic acid amide;
N,N'-bis-1,2-ethylentetradecanoyldicarboxylic acid amide;
N,N'-bis-1,2-propylentetradecanoyldicarboxylic acid amide;
N,N'-bis-1,2-ethylenhexadecanoyldicarboxlic acid amide;
N,N'-bis-1,2-ethylenoctadecanoyldicarboxylic acid amide;
N,N'-bis-1,2-propylenoctadecanoyldicarboxylic acid amide;
N,N'-bis-1,2-propylendodecanoyldicarboxylic acid amide; and
N,N'-bis-1,2-pentylensebacamide;
N,N'-bis-1,2-ethylenisophthalamide
N,N'-1,2-butylenisophthalamide;
N,N'-bis-1,2-propylenisophthalamide;
N,N'-bis-1,2-pentylenisophthalamide;
N,N'-bis-1,2-ethylenterephthalamide;
N,N'-bis-1,2-propylenterephthalamide;
N,N'-bis-1,2-butylenterephthalamide; etc.

Mixtures of these monomers may be produced by employing mixed 1,2-alkylenimines in producing the monomers of the invention in accordance with the process of the invention.

The N,N'-bis-1,2,-alkylenamide curing agents are prepared in monomeric form by the following process: a 1,2-alkylenimine, desirably containing not more than 6 carbon atoms, such as ethylenimine, 1,2-propylenimine, 1,2-butylenimine, 1,2-pentylenimine, etc., is reacted with an aliphatic dicarboxylic acid chloride containing 8 to 12 carbon atoms, (e.g. isosebacoyl dichloride, sebacoyl dichloride, suberoyl dichloride, azelaoyl dichloride, tetradecanoyl dichloride, dodecanoyl dichloride, hexadecanoyl dichloride and octadecanoyl dichloride), isophthaloyl chloride or terephthaloyl dichloride; to produce the desired substantially pure N,N'-bis-1,2-alkylenamide monomer, with hydrogen chloride as a by-product. The 1,2-alkylenimine is employed in a ratio of about 2 moles for each mole of acid chloride. Advantageously, an excess of 1,2-alkylenimine, such as about 5% by weight, over and above this ratio may be employed, although an excess of up to about 25% may be employed.

Desirably, the 1,2-alkylenimine is introduced in an aqueous solution which also contains an alkali metal carbonate, such as sodium, potassium, or lithium carbonate, which acts as an acid-acceptor to neutralize the hydrogen chloride formed during the reaction of the process. When a higher 1,2-alkylenimine than 1,2-ethylenimine, i.e., one containing more than 2 carbon atoms, is employed, an alkali-metal bicarbonate, such as sodium, potassium, or lithium bicarbonate may be used as the acid-acceptor instead of a carbonate. This aqueous solution is intimately mixed with the carboxylic acid chloride dissolved in a substantially water-immiscible organic solvent which is chemically inert to both the reactants and the reaction products and in which the resulting N,N'-bis1,2-alkylenamide is soluble. The N,N'-bis-1,2-alkylenamide monomer reaction product is then recovered in a relatively pure, stable state in high yield from the organic solvent, in which it collects as the reaction proceeds, by evaporating the solvent. By this process of producing the monomers any possibility of attack on the decomposition of the alkylenamide product by hydrogen chloride formed during the course of the reaction is effectively minimized.

It has been discovered that in producing N,N'-bis-1,2-alkylenamides of 1,2-ethylenimine according to the invention, pH control of the reaction mixture is more critical than where alkylenimines containing more than 2 carbon atoms are employed. Thus in such cases it is important to employ an alkali-metal carbonate as the acid-acceptor in an amount sufficient to neutralize all of the hydrochloric acid formed during the reaction of the process and yet maintain the pH of the reaction mixture at about 8.5 or above. With 1,2-alkylenimines containing more than 2 carbon atoms, on the other hand, an alkali-metal bicarbonate may be employed instead of an alkali-metal carbonate as the acid-acceptor, so long as sufficient bicarbonate is present to neutralize all of the hydrochloric acid formed. This phenomenon is believed to be the consequence of the greater reactivity of ethylenimine when compared to those alkylenimines containing more than 2 carbon atoms. The prevention of decomposition of the bis-alkylenamide monomer by the hydrogen chloride formed during the process which this process provides is critical to the production of stable monomer product in useful amounts.

In the preparation of the cured compositions of the invention, the polycarboxyl group-containing prepolymers are employed in liquid form, and if necessary may be warmed slightly to liquefy them. To the selected liquid polycarboxyl prepolymer is then added the bis-amide curing agent which is to be employed. While an amount of the bis-amide which is equivalent stoichiometrically to the number of carboxyl groups present may be employed, and some curing effect can be obtained with even smaller amounts, full cures are effected when amounts greater than stoichiometric amounts are employed, ranging upwards from 10 to 100% greater; and it is ordinarily preferred that about 20 to 40% excesses of the theoretical stoichiometric equivalent of the curing agent be used in order to compensate for any inerts in the curing agent, its adsorption on and reactivity with fillers, etc. The cure is initiated as soon as the two components are mixed. The rate of cure is dependent to a degree upon the temperature, the viscosity of the mixture and the amount of the curing agent which is employed. Obviously, by maintaining the mixture at low temperatures, for example, about 0–10° C., the polymerization is retarded and increased pot life is obtained.

If desired, fillers can be added to the composition before curing, as well as dyes or other substances which may be considered as adjuvants and the like; for example, accelerators, antioxidants, and catalysts. The finer fillers are good reinforcing agents for these systems, neutral fillers such as calcium carbonate, iron oxide and titanium dioxide being preferred. Acidic fillers such as certain carbon blacks and silicas can also be used if proper adjustments are made for pH (e.g. addition of increased amounts of bis-amide curing agent).

In order more clearly to disclose the nature of the present invention, a number of specific products and compositions in accordance with the invention will now be described. It should be understood, however, that this is done solely by way of illustration and is intended neither to delineate the scope of the invention nor limit the ambit of the appended claims. All parts are by weight unless otherwise specified.

PREPARATION OF BIS-AMIDE CURING AGENTS

A. PREPARATION OF
N,N'-BIS-1,2-ETHYLENISOSEBACAMIDE

A solution of about 95.6 parts of isosebacoyl dichloride prepared from "isosebacic acid" (a product of the U.S. Industrial Chemical Company consisting of 72–80% of 2-ethylsuberic acid, 12–18% of 2,5-diethyladipic acid and 6–10% of n-sebacic acid) dissolved in 400 parts of diethyl ether is added dropwise with cooling and vigorous stirring to a flask containing a solution of 110 parts of potassium carbonate and 43 parts of ethylenimine in 800 parts of water. The temperature of the mixture is maintained below 15° C. and the acid chloride is added at a rate of approximately one part per minute. The reaction mixture is allowed to warm gradually to room temperature, while stirring, for an additional hour. During the total reaction period, the pH of the reaction mixture has dropped from approximately 12.5 at the beginning of the reaction to about 8.6 at the end. The ether layer is separated, dried over solid anhydrous sodium hydroxide at 0° C. for 1 hour, the sodium hydroxide is removed by filtration and the ether removed from the filtrate under reduced pressure. The resulting reaction product, N,N'-bis-1,2-ethylenisosebacamide remains as a water-white liquid. The yield is 93% of theoretical. When subjected to analysis the product is found to contain 10.8% nitrogen and 33.3% azirane radical as compared with the calculated values of 11.1% and 33.3%, respectively.

B. PREPARATION OF
N,N'-BIS-1,2-BUTYLENISOSEBACAMIDE

To a reaction flask equipped with a stirrer, thermometer, condenser and dropping funnel is charged a solution of about 55.2 parts of potassium carbonate and 15.8 parts of 1,2-butylenimine in 200 parts of water. The solution is stirred and cooled to about 4° C. To the cooled solution is then added dropwise, with stirring and cooling, over a period of about 23 minutes, a solution of about 23.9 parts of isosebacoyl chloride dissolved in about 72 parts of diethyl ether. During the addition, the temperature of the reaction mixture is maintained at about 4–8° C. After the addition is completed, the mixture is allowed to warm gradually to room temperature (21° C.) and stirring is continued for about 12 hours. During the course of the reaction the pH falls from pH 12.5 at the beginning to about pH 10.0 at the end. The ether layer is separated and dried by storing over anhydrous sodium hydroxide pellets for 1 hour at 0° C., the pellets are removed by filtration and the ether evaporated. The resulting N,N'-bis-1,2-butylenisosebacamide remains a water-white liquid. The yield is about 90% of theoretical. When subjected to analysis the N,N'-bis-1,2-butylenisosebacamide thus prepared was found to contain 0.6% chlorine and 43.1% 2-ethylazirane radical as compared with the calculated values of 0% and 45.5%, respectively.

It will be obvious that the curing agents employed herein are prepared by selecting the appropriate 1,2-alkylenimine and dicarboxylic acid chloride, which are condensed by the procedures set forth above. In this way, the following compounds, which are further illustrative of the curing agents of the invention, are prepared, having the noted properties:

| Compound | M.P., ° C. | Appearance |
|---|---|---|
| N,N'-bis-1,2-ethylensebacamide | 59.5–61 | White, crystalline solid. |
| N,N'-bis-1,2-ethylenazelaamide | 44–46.5 | Do. |
| N,N'-bis-1,2-ethylendodecane-dicarboxylic acid amide. | 74–76 | Tan-colored solid. |
| N,N'-bis-1,2-propylensebacamide | 31.5–32.5 | White, crystalline solid. |
| N,N'-bis-1,2-propylenisosebacamide. | | Water-white liquid. |
| N,N'-bis-1,2-ethylenisophthalamide. | 76–78 | White, crystalline solid. |
| N,N'-bis-1,2-butylenisophthalamide. | | Water-white viscous liquid. |
| N,N'-bis-1,2-propylenisophthalamide. | | Water-white liquid. |
| N,N'-bis-1,2-ethylenterephthalamide. | 140 | White, crystalline solid. |
| N,N'-bis-1,2-propylenterephthalamide. | 96–108 | Do. |
| N,N'-bis-1,2-butylenterephthalamide. | 98–110 | Do. |

In the same way, there are prepared the other N,N'-bis-1,2-alkylenamides described hereinabove.

PREPARATION OF CARBOXYL GROUP CONTAINING PREPOLYMERS (These preparations are classified as above)

*I. Branched polyesters*

Of the seven preparations of branched polyesters which follow, the first five (A through E) illustrate the use of a polyfunctional alcohol, one or more diols and one or more dibasic acids, the sixth (F) illustrates the use of a polyfunctional acid, one or more dioyls and one or more dibacic acids and the seventh (G) illustrates the use of a polyfunctional acid and a hydroxy or an amino acid as starting materials for the desired products.

A. BULK PREPARATION OF POLYESTER OF ADIPIC ACID, DIETHYLENE GLYCOL AND TRIMETHYLOLPROPONE

About parts of adipic acid, 388 parts of diethylene glycol, 12.44 parts of trimethylolpropane and 2 parts of a triphenyl phosphite catalyst are charged to a stirred flask. The reaction is carried out at 160–180° C. in a nitrogen atmosphere. When approximately the theoretical amount of water of esterification has been driven off (indicating that the reaction is essentially complete) the pressure is reduced gradually and the temperature is increased to 220° C. The reaction is terminated when the acid number of the melt reaches 27.9. The characteristics of the polyester are as follows:

Inherent viscosity in acetone _____ 0.13
Number average degree of polymerization ($\bar{X}_n$) ___ 50
Molecular weight ($\bar{M}_n$) _____ 5000
Free carboxyl groups per molecule (average) ____ 2.6
Acid concentration (milliequivalents per gram) ___ 0.50

B. BULK PREPARATION OF A POLYESTER OF ADIPIC ACID, DIETHYLENE GLYCOL AND GLYCEROL

About 146 grams (1.0 mole) of adipic acid, 85.5 grams (0.80 mole) of diethylene glycol, and 9.2 grams (0.10 mole) of glycerol are charged to a stirred 250 milliliter flask. The reaction is carried out at 160–180° C. in a nitrogen atmosphere. The bulk of the water of esterification is removed (by distillation) within the first four hours and the remainder is then removed by lowering the pressure and raising the temperature of the reaction to 220° C. About two hundred grams of polymer are recovered. Its characteristics are as follows:

Inherent viscosity in acetone _____ .08
Acid number (milligrams of potassium hydroxide per gram of sample) _____ 58.0
Number average degree of polymerization ($\bar{X}_n$) __ 20
Molecular weight ($\bar{M}_n$) _____ 2000

Free carboxyl groups per molecule (average) ____ 3.0
Acid concentration (milliequivalent per gram) ____ 1.04

C. AZEOTROPIC PREPARATION OF A POLYESTER OF SEBACIC ACID, NEOPENTYL GLYCOL AND TRIMETHYLOL PROPANE

About 202 parts of sebacic acid, 89.4 parts of neopentyl glycol and 3.7 parts of trimethylol propane are charged to a flask which is fitted with a Barrett trap, a thermometer which is immersed in the liquid reaction mixture and a reflux condenser. A volume of benzene approximately equal to that of the reaction mixture is added and the liquid is heated to reflux. The refluxing is continued (the water of condensation being removed by the Barrett trap as it is formed) until the distillate becomes clear and the acid number of the polymer approaches the theoretical value. The benzene is then removed by distillation. The characteristics of this polyester are as follows:

Number average degree of polymerization ($\overline{X}_n$) ____ 23
Free carboxyl groups per molecule (average) _____ 2.3
Acid concentration (milliequivalents per gram) ____ .94
Acid number _____ 53

D. AZEOTROPIC PREPARATION OF A POLYESTER OF AZELAIC ACID, OXYPROPYLATED BIS-PHENOL A AND TRIMETHYLOL PROPANE

About 188 grams (1 mole) of azelaic acid, 172 grams (0.5 mole) of 2,2-bis[4-(2-hydroxypropoxy)phenyl]propane, 22.4 grams (0.116 mole) of trimethylolpropane, 1.0 gram of paratoluene sulfonic acid and 300 milliliters of benzene are charged to a 1 liter flask equipped with a Stark-Dean water-separator and a condenser. The mixture is heated at reflux until the theoretical amount of water has been removed. The characteristics of the polyester are as follows:

Number average degree of polymerization ($\overline{X}_n$) ___ 10
Free carboxyl groups per molecule (average) _____ 3.0
Acid concentration (milliequivalents per gram) ____ 1.43
Acid number _____ 80

E. BULK PREPARATION OF POLYESTER OF ISOSEBACIC ACID, NEOPENTYL GLYCOL AND TRIMETHYLOLPROPANE

About 515 parts of isosebacic acid, 221 parts of neopentyl glycol and 13.5 parts of trimethylolpropane are charged to a stirred flask. The reaction is carried out at approximately 160–180° C. in a nitrogen atmosphere. When approximately the theoretical amount of water of esterification has been driven off (indicating that the reaction is essentially complete) the pressure is reduced gradually and the temperature is increased to 250° C. The reaction is terminated when the acid number of the melt reaches 60.6. The viscosity of the resulting polyester is found to be 3700 centipoises at 150° F. when measured with a Brookfield viscometer.

Number average degree of polymerization ($_1\overline{X}_n$ ___ 20
Molecular weight ($\overline{M}_n$) _____ 2000

F. THE BULK PREPARATION OF THE POLYESTER OF TRIMESIC ACID, DIETHYLENE GLYCOL AND ADIPIC ACID

About 263 parts of adipic acid, 191 parts of diethylene glycol, 21 parts of trimesic acid and 650 parts of benzene are charged to a stirred flask and refluxed with agitation for about 6 hours. The water of condensation which forms during the reaction is removed in a Barrett trap. The benzene is removed at the end of the reaction leaving a mobile liquid polyester of which the acid number is 42 (acid concentration 0.75 milliequivalent per gram).

G. BULK PREPARATION OF THE POLYESTER OF γ-METHYL-ε-CAPROLACTONE AND BENZENE TETRACARBOXYLIC ACID

About 2500 parts of γ-methyl-ε-caprolactone and 127 parts of benzene tetracarboxylic acid are heated together for 20 hours at 170° C. The resulting polymer is a viscous liquid with an acid number of 43 and an acid concentration of 0.77 milliequivalent per gram.

II. Dianhydride-extended polyesters

A. PREPARATION OF A POLYESTER OF DIETHYLENE GLYCOL, ADIPIC ACID AND PYROMELLITIC DIANHYDRIDE

A glycol-terminated linear polyester is prepared by heating together 212 parts (2.0 moles) of diethylene glycol and 146 parts (1.0 mole) of adipic acid until the calculated amount of water is removed. The resulting prepolymer is condensed further by heating to 220° C. under a high vacuum and distillation of diethylene glycol until the inherent viscosity in acetone is about 0.06.

One hundred parts of the above hydroxyl-terminated polyester are heated with ten parts of pyromellitic dianhydride at 150° C. until the inherent viscosity in acetone amounts to about 0.10 and the acid number is 56 milligrams of KOH per gram.

III. Anhydride-extended polyether glycols

Of the three preparations of anhydride-extended polyether glycols which follow, the first one (A) illustrates the use of a polyether glycol and a dianhydride and the second and third (B and C) illustrate the use of a branched polyether alcohol and a cylic acid anhydride as starting materials for the desired products.

A. PREPARATION OF A POLYETHER ESTER OF A HYDROXYL-TERMINATED POLYETHER OF BUTYLENE OXIDE AND PYROMELLIC DIANHYDRIDE

About 100 parts of Dow Polyglycol B–1000 (a hydroxyl-terminated polyether of butylene oxide of an average molecular weight of 1000) is stirred and heated with 21.8 parts of pyromellitic dianhydride until the mixture reaches a viscosity of approximately 700 poises.

B. PREPARATION OF A POLYETHER-ESTER OF A HYDROXYL-TERMINATED POLYETHER AND SUCCINIC ANHYDRIDE 185 grams of a reaction product of glycerine, ethylene oxide, and propylene oxide of the general formula:

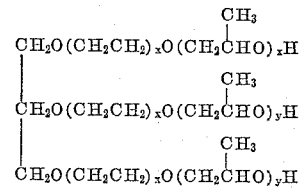

having an average molecular weight of about 1100 (Dow 15–100), 300 cc. of benzene and 28 grams of succinic anhydride are charged to a 1-liter stirred flask which is fitted with a reflux condenser. The mixture is stirred and reacted for 8 hours at reflux. A small amount of water of condensation which forms during the reaction is removed in a Barrett trap. The benzene is removed by distillation and the resulting polyether is a mobile, light yellow liquid. The acid number of the polyether is found to be 69.6.

C. PREPARATION OF A POLYETHER-ESTER OF A HYDROXYLTERMINATED POLYETHER AND SUCCINIC ANHYDRIDE 270 parts of a reaction product of ethylene oxide, propylene oxide and ethylene diamine of an average molecular weight of 2700 and represented by the formula:

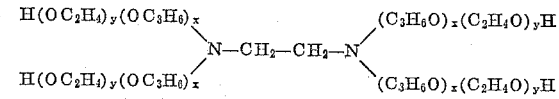

are mixed with 40 parts of succinic anhydride and a catalytic amount of pyridine. The mixture is heated for four hours at 125° C. at which time the acid number has reached about 70. The polymer contains 4 carboxyl groups per molecule and the acid content is 1.25 milliequivalents per gram.

IV. Vinyl-type copolymers

A. PREPARATION OF A COPOLYMER OF METHOXYETHYL ACRYLATE AND ACRYLIC ACID

About 25 parts of methoxyethyl acrylate, 0.25 part of acrylic acid, 0.50 part of tertiary dodecyl mercaptan and 0.10 part of tertiary butyl peroxide are sealed in a heavy-walled glass ampoule in the absence of air. The sealed ampoule is held at 100° C. (with agitation) for 20 hours. A liquid polymer is obtained which has an inherent viscosity in acetone of 0.11 and an acid number of 7.5.

B. PREPARATION OF A COPOLYMER OF BUTADIENE AND ACRYLIC ACID

About 90 parts by weight of butadiene, 10 parts of acrylic acid, 180 parts of water, 5 parts of sodium lauryl sulfate, 5 parts of sodium sulfate, one part of potassium persulfate, and 6 parts of commercial grade tertiary dodecyl mercaptan are charged into a heavy walled pressure vessel. The vessel is sealed, placed in a water bath at 55° C. and agitated for 18–20 hours at which time the polymerization is 75–80 complete. The unreacted butadiene is bled off and the latex is coagulated by the addition of a 5% solution of barium chloride. The coagulated polymer is washed by agitating it with a large amount of water, and then blended with 1½ parts of an antioxidant. The liquid polymer is dried by passing it over a hot drum drier. The product is a viscous liquid with an inherent viscosity of 0.19 and an acid number of 49.

The elastomer-producing compositions provided by admixture of the prepolymers and the curing agents included within the scope of the invention are generally speaking substantially liquid or viscous, semi-solid substances, which can be compounded with fillers and the like to produce more or less viscous products. (By the term "substantially liquid" as used throughout the specification it is meant that the substance is capable of flowing and has a maximum viscosity of the order of about 10,000 poises. Materials which approach this upper limit of viscosity may require warming to facilitate handling.) These uncured systems may be introduced into joints or spaces which are to be sealed, using the ordinary means available to the art, such as caulking guns and the like. The compositions undergo spontaneous curing, producing elastomers which provide effective sealing means. Alternatively it will be obvious that metal sheets or the like which are to be sealed can be coated with the elastomer-producing compositions along lines of juncture, for example, on the abutting portions of lap joints, and then rivetted, crimped together or otherwise joined, whereupon the elastomer produced on curing will seal the joint. Likewise, by employing materials of low viscosity or by employing solvents to reduce viscosity, the composition in which curing has been initiated can be utilized to coat surfaces, for example, interior surfaces of fuel tanks and the like, to seal the joints thereof and at the same time provide a substantially fuel-proof lining therefor. In another aspect of the invention, the elastomer-producing compositions in uncured state, compounded if desired with pigments, fillers or the like, can be employed to coat fabrics. On curing, a tightly adherent continuous elastomeric film is formed which seals and protects the fabric. Such films are very flexible, even at very low temperatures, and are markedly abrasion-resistant.

The prepolymers included within the scope of the invention are cured by the bis-amide curing agents primarily by chain extension, although crosslinking occurs where crosslinking sites are available in the prepolymer. Generally speaking, a slight amount of crosslinking is necessary in order to produce elastomers which exhibit substantially no cold flow.

The following examples illustrate the curing of the prepolymers of the invention with the curing agents specified herein, and the products thus obtained.

EXAMPLE 1

About 100 parts of the adipic acid-diethylene glycol-trimethylolpropane polyester of preparation I–A above and 25 parts of carbon black (Philblack O) are mixed on a three roll Day paint mill at room temperature until the mixture becomes homogeneous. 16 parts by weight of N,N'-bis-1,2-ethylenisosebacamide are added at room temperature and the mixture is stirred vigorously.

This viscous, filled polymer mixture is applied with a caulking gun to a 17–7 stainless steel surface (such as is found in aircraft fuel cells) and is allowed to cure at room temperatures. After three days it is tack free as measured by the clean release of polyethylene film which is pressed against its surface.

A series of comparative tests are run as shown, infra. A commercial aircraft sealant based on liquid polysulfide polymer which is representative of the best material presently available commercially for sealing aircraft fuel cells is included for the purpose of comparison. This material is based upon a liquid polysulfide polymer which is a thiol-terminated liquid polymer of bis(ethyleneoxy) methane having a viscosity at 25° C. of 350–450 poises, a number average molecular weight of 4000 and a pour point of 35° F. and which is available commercially from the Thiokol Corporation of Trenton, N.J., under the trade designation "LP-2," and containing fillers, curing agents and the like to produce an elastomer.

|  | Bis-amide polyester sealant | Commercial polysulfide-based aircraft sealant |
|---|---|---|
| After a cure cycle of 2 weeks at room temperature: | | |
| Tensile strength, p.s.i.[1] | 425 | 160 |
| Elongation, percent [1] | 95 | 155 |
| Scott brittleness, $T_B$, ° F. (ASTM D 764–52T) | −40 | −40 |
| Gehman $T_{10}$, ° F. (ASTM D 1053–52T) | −40 | −49 |
| Shore hardness, A–2 (ASTM D 676–49T) | 55 | 45 |
| Percent volume swelling after one week submerged in the following liquids at 160° F. (ASTM D 471–52T): | | |
| JP–4 fuel of MIL–F–7914 (Aer) | 12.5 | −19.1 |
| Water | 0.0 | 48.0 |
| Skydrol 500 (phosphate ester hydraulic oil) | 140.0 | dissolves |
| OS–45 coolant (silicate ester fluid) | 3.0 | −12.5 |

[1] Tensile and elongation: dumbbell specimens (0.5" by 0.125" between bench marks) 0.05" thick at jaw separation rate of 2"/min. Test values correlate with those from ASTM D 412–51T.

|  | Bis-amide polyester sealant | Commercial polysulfide-based aircraft sealant |
|---|---|---|
| Aged 1 week at 350° F. in air: | | |
| Tensile strength, p.s.i. | 344 | (¹) |
| Elongation, percent | 70 | (¹) |
| Shore hardness, A–2 | 60 | >100 |
| Weight loss, percent | 9.8 | >50 |

[1] Too brittle to test.

It is noted that the bis-amide-cured sealant is still operative as a rubbery sealant after 168 hours at 350° F. and the polysulfide-based sealant has completely lost its rubbery properties and has become useless. The fuel resistance of the bis-amide-cured sealant is also superior to that of the polysulfide sealant.

The compositions of the invention are also useful for treating initially porous fibrous webs. About 300 parts of a similar diethylene glycol adipate trimethylol propane polyester (acid content of about 0.73 milliequivalent per gram, number average degree of polymerization 40, molecular weight 4050), 38.11 parts of N,N'-bis-1,2-ethylenisosebacamide, 3.0 parts of a symmetrical di-beta-naphthyl paraphenylene diamine antioxiant (Agerite White, a product of R. T. Vanderbilt Co.) and 45.0 parts of a silica filler (Cabosil, a product of Godfrey L. Cabot Inc.) are mixed thoroughly. The mixture is knife-coated onto several different woven cloths (the knife coater being set at .018 inch in each case). Each lot of coated cloth is doubled over, subjected to a pressure of about one pound per square inch over the area of contact and cured tack free in 25 minutes at 250° F. One inch wide test pieces are cut from each lot and the ends of each test piece (which are not adhered together) are clamped in the jaws of a tensile testing machine. The cloth-to-polymer adhesions are tested by determining the force required to separate them at a rate of 20 inches per minute, the adhered double thickness of cloth being held at 90° to the direction of jaw separation. The following adhesion values are obtained (in pounds per inch of width):

Polyethylene _____ 8.8
Nylon (4 oz. per square yard cloth weight) _____ 8.6
Nylon (5½ oz. per square yard cloth weight) _____ 7.5
Glass cloth _____ 5.0

Comparable test values of commercial vinyl fabric treatments run from one to two pounds per inch of width.

EXAMPLE 2

A series of diethylene glycol adipate-trimethylol-propane polyesters are prepared by the method used in preparation I-A hereinafter. The purpose is to compare them for effects of branching, molecular weight and filler loading on physical properties. The polyesters are as follows:

|  | Lot | | | |
| --- | --- | --- | --- | --- |
|  | A | B | C | D |
| Number average degree of polymerization ($\bar{X}_n$) | 9 | 16 | 19 | 50 |
| Branches per molecule ($\beta$) | 1.0 | 0.5 | 1.0 | 1.0 |
| Monomer units per branch ($\bar{X}_n/\beta$) | 9 | 32 | 19 | 50 |
| Inherent viscosity (in acetone) | .07 | .08 | .12 | .13 |
| Free carboxyl groups per molecule (average) | 3.0 | 2.5 | 3.0 | 3.0 |
| Acid content (milliequivalent H+ per gram) | 3.06 | 1.43 | 1.38 | 0.623 |

About 100 parts of each polyester and 45 parts of carbon black (Philblack O) are mixed on a three roll Day paint mill at room temperature until the mixture in each case becomes homogeneous. A 30% molar excess of N,N'-bis-1,2-ethylenisosebacamide (based on the free carboxyl group concentration in each polyester) is added to each at room temperature and the mixtures are stirred vigorously and molded into flat sheets. A firm, low-tack rubber is formed by a lot A after standing for 6 hours, by lots B and C after standing for 24 hours and by lot D after standing for 3 days (all at room temperature).

|  | Lot | | | |
| --- | --- | --- | --- | --- |
|  | A | B | C | D |
| Tensile strength, p.s.i. | 800 | 1,650 | 1,300 | 1,275 |
| Elongation, percent | 75 | 195 | 110 | 450 |
| Scott brittleness, $T_B$, °F | −24 | −31 | −29 | −60 |
| Percent volume swelling after being submerged in 70% isooctane, 30% toluene fuel for 48 hours | 7 | 24 | 15 | 15 |

EXAMPLE 3

About 100 parts of an acid terminated polyester of adipic acid, diethylene glycol and trimethylolpropane (prepared according to the procedure of preparation I-A above) which has an acid number of 52 and which contains an average of 2.6 free carboxyl groups per molecule are mixed with 15 parts of N,N'-bis-1,2-propylenterephthalamide and the mixture is heated with agitation until solution is complete. The resulting viscous liquid is then cured for one hour at 350° F. to form a somewhat soft, tacky rubber.

EXAMPLE 4

About 100 parts of the polyester of the previous example are mixed with 15 parts of N,N'-bis-1,2-butylenterephthalamide and the mixture is heated with agitation until solution is complete. The resulting viscous liquid is cured for one hour at 350° F. to form a rather soft, tacky rubber.

EXAMPLE 5

30 parts of N,N'-bis-1,2-ethylenisosebacamide and 200 parts of the adipic acid-diethylene glycol-glycerol polyester of preparation I-B above are mixed and the mixture is poured into open molds. A firm, low-tack rubber is formed after standing at room temperature for about two days. The following test data are obtained after seven days at room temperature.

Tensile strength, p.s.i. _____ 50
Elongation, percent _____ 160
Break set, percent [1] _____ 0
Gehman $T_{10}$, °F. _____ −25
Scott brittleness, $T_B$, °F. (ASTM-D746-57T) _____ −80
Percent volume swelling after being submerged in the following liquids as specified:
    85% isooctane, 15% toluene fuel, 48 hrs. at 120° F. _____ 7
    Turbo oil 15 (MIL-L-7808) 48 hrs. at 212° F. _____ 2
    Petroleum-base hydraulic oil (MIL-O-5606) 48 hrs. at 212° F. _____ 2

[1] From tensile and elongation test samples.

EXAMPLE 6

An acid terminated polyester of 131.5 parts (1.0 equivalent) of adipic acid, 77 parts (.805 equivalent) of diethylene glycol and 8.35 parts (.0695 equivalent) of trimethylolpropane is prepared according to the procedure of preparation I-A above. This polyester contains an average of 3.0 free carboxyl groups per molecule, has an acid number of 53 (corresponding to an acid content of 0.95 milliequivalent per gram), a number average degree of polymerization ($\bar{X}_n$) of 27, an inherent viscosity in acetone of .105, and a branching index of 1.0.

About 100 parts of the polyester, 15.2 parts of N,N'-bis-1,2-ethylenisosebacamide, 5 parts of Valron Estersil (a reinforcing grade silica surface-reacted with butyl alcohol), 5 parts of titanium dioxide filler and 1 part of Stabilite White Liquid antioxidant (liquid phenol-formaldehyde A-stage resin; a product of C. P. Hall Co.) are mixed thoroughly, the mixture is coated on woven glass cloth, the coated cloth is cured for 10 minutes at 300° F. and stored at room temperature. It is tack free in from 3 to 5 days. This coated fabric has excellent heat and solvent resistance. Its abrasion resistance is far better than presently used fabric coatings, e.g. vinyls (as measured on MIL-C-7719) and it passes the flexibility tests of MIL-C-7719 at −90° F. It may be given any of a wide variety of colors by varying the fillers and pigments used since the polyester and its curing agent are both nearly colorless.

EXAMPLE 7

Three mixtures, each containing a straight chain polyester (diethylene glycol adipate), a trifunctional polyester (trimethylolethane trisuccinate) and N,N'-bis-1,2-ethylenisosebacamide are prepared as follows:

|  | Lot (parts by weight) | | |
| --- | --- | --- | --- |
|  | A | B | C |
| Diethylene glycol adipate | 9.2 | 9.2 | 9.2 |
| Trimethylolethane trisuccinate | 1.97 | 0.98 | 0.49 |
| N,N'-bis-1,2-ethylenisosebacamide | 4.35 | 3.05 | 2.40 |

The properties of the polyester portions of these three mixtures (i.e. the mixture of straight chain and trifunctional polyesters) are as follows:

|  | Lot | | |
|---|---|---|---|
|  | A | B | C |
| Number average degree of polymerization ($\overline{X}_n$) | 15 | 12 | 11 |
| Carboxyl groups per molecule (average) | 2.6 | 2.43 | 2.28 |
| Acid concentration (milliequivalents per gram) | 2.93 | 1.98 | 1.58 |
| Branching index | .6 | .43 | .28 |

The resulting compositions cure completely on standing at room temperature. However, increasing the temperature brings about more rapid curing. Therefore, for test purposes, all three lots are cured for six hours at 250° F. and evaluated as follows:

|  | Lot | | |
|---|---|---|---|
|  | A | B | C |
| Properties: | | | |
| Tensile, p.s.i. | 125 | 90 | 40 |
| Elongation, percent | 200 | 275 | 350 |
| Break set, percent | 0 | 0 | 0 |
| Gehman $T_{10}$, ° F. | 4 | −5 | −3 |
| Brittle point, ° F. | −42 | −42 | −41 |
| 70% isooctane, 30% toluene fuel swelling, 48 hours submergence at 180° F. | 7 | 15 | 15 |
| Air aging, 96 hours/350° F.: | | | |
| Tensile, p.s.i. | 70 | 27 | 17 |
| Elongation, percent | 45 | 35 | 45 |
| Weight loss, percent | 16 | 13 | 17 |

EXAMPLE 8

A polyester of 146.2 parts (1.0 equivalent) of adipic acid, 96.2 parts (.833 equivalent) of diethylene glycol and 10.5 parts (.0625 equivalent) of trimethylolpropane is prepared according to the procedure of I–A above. The polyester has a number average degree of polymerization ($\overline{X}_n$) of 40, an inherent viscosity of .105 in acetone, an acid concentration of 0.95 milliequivalent per gram, an acid number of 53, a branching index of 1 and contains an average of 3.0 free carboxyl groups per molecule.

Two lots of viscous liquid sealant are prepared from this polyester, carbon black and N,N'-bis-1,2-ethylenisosebacamide. The first (lot A) contains 100 parts of polyester, 25 parts of filler and 16 parts of bis-amide. The second (lot B) contains 100 parts of polyester, 15 parts of filler and 16 parts of bisamide. Lots A and B are then poured into open molds, curved and evaluated as follows:

|  | Lot | |
|---|---|---|
|  | A | B |
| After cure cycle of 168 hours at room temperature: | | |
| Tensile strength, p.s.i. | 426 | 300 |
| Elongation, percent | 95 | 125 |
| A₂ durometer (shore hardness) | 55 | 50 |
| After aging cycle of 168 hours at 350° F.: | | |
| Tensile strength, p.s.i. | 344 | 230 |
| Elongation, percent | 70 | 60 |
| Shore hardness, A-2 | 60 | 55 |
| Weight loss, percent | 9.8 | 11.1 |
| After aging cycle of 168 hours at 400° F.: | | |
| Tensile strength, p.s.i. | 324 | |
| Elongation, percent | 10 | |
| Shore hardness, A-2 | 90 | 87 |
| Weight loss, percent | 30.0 | |
| After aging cycle of 168 hours at 160° F. submerged in the following liquids: | | |
| JP-4 fuel: | | |
| Tensile strength, p.s.i. | 408 | |
| Elongation, percent | 100 | |
| Skytrol 500: | | |
| Tensile strength, p.s.i. | 215 | |
| Elongation, percent | 60 | |
| Percent volume swelling after 168 hours submerged in the following liquids at 160° F.: | | |
| JP-4 fuel | 12.5 | 19.1 |
| Water | 0.0 | 9.2 |
| Skysrol 500 | 140.0 | 151.0 |
| Coolant OS-45 | 3.0 | 0.0 |
| Percent weight change after 168 hours submerged in the following liquids st 160° F.: | | |
| JP-4 fuel | 9.8 | 12.5 |
| Water | 2.4 | 5.2 |
| Skysrol 500 | 113.0 | 124.0 |
| Coolant OS-45 | −2.7 | −1.4 |

EXAMPLE 9

80 grams of the neopentylsebacate polyester of preparation I–C above and 12.5 grams of N,N'-bis-1,2-ethylenisosebacamide are mixed thoroughly and the mixture is poured onto open polyethylene molds. After 3 days at room temperature, a highly elastic but slightly tacky rubber has formed.

EXAMPLE 10

An acid-terminated polyester of 40.2 parts (1.0 equivalent) of diglycolic acid, 25 parts (0.80 equivalent) of neopentyl glycol and 2.68 parts (.066 equivalent) of trimethylol propane is prepared according to the procedure of I–A above. This polyester has a number average degree of polymerization ($\overline{X}_n$) of 9, an inherent viscosity of .075 in acetone, an acid concentration of 1.4 milliequivalents per gram, an acid number of 78, a branching index of 0.3 and contains an average of 2.3 free carboxyl groups per molecule.

20 grams of this polyester and 4.4 grams of N,N'-bis-1,2-ethylenisosebacamide are mixed thoroughly and diluted with a few drops of chloroform so that the mixture can be poured easily. The mixture is poured into open polyethylene molds and allowed to remain for 2 hours at room temperature, at the end of which time it has gelled to a soft rubber.

EVALUATION

Original mechanical properties:
  Tensile strength, p.s.i. _____ 113
  Elongation, percent _____ 160
  Break set, percent _____ 0
Percent volume swelling after 48 hours submerged in 70% isooctane:30% toluene fuel at 180° F.___ 0

EXAMPLE 11

40 grams of the azelaic acid-oxypropylated bis-phenol A-trimethylol propane polyester of procedure I–D above are dissolved in methylethyl ketone and this solution is mixed with 9.2 grams of N,N'-bis-1,2-ethylenisosebacamide. The mixture is divided into two portions. The first portion is poured into open aluminum molds previously coated with a suitable release agent; the second portion is poured into open polyethylene molds. The first portion is then cured for 1½ hours at 100° C. At the end of this cure cycle, the material is removed from the molds and is found to be a tough, snappy rubber. The following data are obtained from tests of this material:

|  | Original | Aged 96 hrs./350° F. |
|---|---|---|
| Tensile, p.s.i. | 210 | 250. |
| Elongation, percent | 110 | 145. |
| Condition | Snappy rubber | Very flexible. |
| Percent swelling in water 70 hrs./180° F. | 15 | |

The second portion is allowed to stand for 16 hours at room temperature. At the end of this time, the mixture is found to be a soft, pliable rubber.

EXAMPLE 12

About 100 parts of the isosebacic acid-neopentyl glycoltrimethylolpropane polyester of preparation I–E above, 25 parts of carbon black (Philblack A), 2 parts of Agerite White and 18.4 parts of N,N'-bis-1,2-ethylenisosebacamide are mixed on a three roll Day paint mill until the mixture becomes homogeneous. The resulting black, workable paste is allowed to cure for 2 weeks at room temperature to form a slightly tacky, snappy rubber. The following data are gathered from tests run on this material:

Tensile strength, p.s.i. _____ 940
Elongation at break, percent _____ 300
Shore hardness, A–2 _____ 55
Gehman $T_{10}$, °F. _____ −22

The following data are gathered from tests run on the same material after it has been further aged for 7 days at 350° F. in a circulating air oven:

Tensile strength, p.s.i. _____ 320
Elongation at break, percent _____ 350
Shore hardness, A–2 _____ 37

EXAMPLE 13

An acid-terminated polyester of 350 parts (1.0 equivalent) of adipic acid, 212 parts (.83 equivalent) of diethylene glycol and 9.2 parts (.062 equivalent) of glycerol is prepared according to the procedure of I–A above. This polyester has a number average degree of polymerization ($\overline{X}_n$) of 22, an inherent viscosity of .08 in acetone, an acid concentration of 1.16 milliequivalents per gram, an acid number of 65, a branching index of 0.5 and contains an average of 2.5 free carboxyl groups per molecule.

Portions of this polyester are mixed separately with 30% molar excesses of N,N'-bis-1,2-ethylenisosebacamide and N,N'-bis-1,2-ethylensebacamide. Both mixtures are allowed to stand for 70 hours at room temperature at the end of which time they are snappy, flexible rubbers.

EXAMPLE 14

One hundred parts of the polyester described in Example 4 and 13.5 parts of N,N'-bis-1,2-ethylenisophthalamide are mixed thoroughly and the mixture is poured into open polytetrafluoroethylene molds. After a cure cycle of two hours at 300° F. a highly elastic, soft rubber is formed.

EXAMPLE 15

3.5 grams of the polyester described in Example 4 and 0.5 gram of N,N'-bis-1,2-ethylendodecanedicarboxylic acid amide dissolved in a few drops of chloroform are mixed thoroughly and the mixture is poured into open polyethylene molds. After a cure cycle of from three to four days at room temperature a somewhat stiff, tack-free rubber has formed.

EXAMPLE 16

About 20 grams of the polyester described in Example 4 and 3.3 grams of N,N'-bis-1,2-propylensebacamide are mixed thoroughly and the mixture is poured into open polyethylene molds. After three days at room temperature a highly elastic but slightly tacky rubber has formed.

The Gehman $T_{10}$ temperature of this rubber is −45° F. which indicates low temperature properties approximately comparable to the polysulfide rubbers. After 48 hours' submergence in 70% isooctane–30% toluene fuel at 180° F. (MIL–H–3136 type 3) this rubber has swelled 32% in volume. After 48 hours' submergence in water at 180° F. the rubber exhibits a 69% volume swelling.

EXAMPLE 17

The polyester of preparation I–F above, is mixed with a 30% molar excess of N,N'-bis-1,2-ethylenisosebacamide and the mixture is poured into open polyethylene molds. A tough rubber is formed within 24 hours at room temperature.

EXAMPLE 18

The polyester of preparation I–G above is mixed with a 30% molar excess of N,N'-bis-1,2-ethylenisosebacamide and the mixture is poured into open polyethylene molds. A tough rubber is formed within 24 hours curing at room temperature.

EXAMPLE 19

1.7 grams of N,N'-bis-1,2-ethylenisophthalamide are dissolved in a few drops of chloroform and this solution is mixed with 40 grams of the pyromellitic dianhydride-extended hydroxy-terminated diethylene glycol adipate polyester of preparation II–A above. This mixture is poured into open aluminum molds which have previously been treated with a suitable release agent and is allowed to stand for 30 minutes at room temperature. At the end of this time it has cured to a clear, snappy rubber.

EXAMPLE 20

The pyromellitic dianhydride-extended polyether glycol of preparation III–A above, is mixed with a 30% molar excess of N,N'-bis-1,2-ethylenisosebacamide and the mixture is poured into open polyethylene molds. After 2 hours at room temperature a flexible, resinous, cross-linked product results.

EXAMPLE 21

About 20 grams of the polyether-ester of preparation III–B above and 6.85 grams of N,N'-bis-1,2-ethylenisosebacamide are mixed thoroughly and the mixture is cured for 32 hours at 250° F. The following mechanical test data are obtained:

Brittle point, °C. _____ −30 to −33
Gehman $T_{10}$, °C. _____ −36.5

EXAMPLE 22

20 parts of the polyether-ester of preparation III–C above are mixed with 5.4 parts of N,N'-bis-1,2-ethylenisosebacamide. After 15 minutes at 250° F. or 16–24 hours at room temperature it cures to a tough, tack-free resilient rubber.

EXAMPLE 23

17 grams of a 90:10 copolymer of butadiene and acrylic acid prepared according to the method of preparation IV–B above and 3.4 grams of N,N'-bis-1,2-ethylenisosebacamide are mixed thoroughly and the mixture is poured into open polyethylene molds. After three days at room temperature a high elastic but slightly tacky rubber has formed.

EVALUATION

Original mechanical properties:
  Tensile strength, p.s.i. _____ 130.
  Elongation, percent _____ 100.
  Set at break, percent _____ 0.
  Gehman $T_{10}$, °C. _____ −46.
  Brittle point, $T_B$, °F. _____ Below −94.

Mechanical properties after cure cycle of 70 hours at 250° F.:
  Tensile strength, p.s.i. _____ 202.
  Elongation, percent _____ 55.
  Weight loss, percent _____ 4.

EXAMPLE 24

60 parts by weight of a 90:10 low molecular weight copolymer of butadiene and acrylic acid (prepared according to the method of preparation IV–B above) are dissolved in 40 parts by weight of a solvent consisting of 55% heptane, 25% isopropylacetate and 20% isopropanol. This solution is divided into three parts. To the first part is added 5% of N,N'-bis-1,2-ethylensebacamide (based upon the copolymer solids) and a film is cast from a portion of this solution. To the second part is added 10% of N,N'-bis-1,2-ethylensebacamide (based on the copolymer solids) and a film is also cast from a portion of this solution. The third part of the copolymer solution serves as a control and a portion of it is cast into a film without the addition of any curing agent.

The films are dried and their Constant Stress 10-Minute Moduli (as described by Dahlquist et al., Ind. Eng. Chem. 43, 1404 (1951)), are measured. The moduli are found to increase in proportion to the amount of curing agent present. Both solutions which contain bis-amides are gelled after aging over night at room temperature while the control solution remains liquid.

EXAMPLE 25

100 parts of a 90:10 copolymer of butadiene and acrylic acid (prepared by the method of preparation IV–B above) and 13.35 parts of N,N'-bis-1,2-ethylenisophthalamide are mixed thoroughly and the mixture is poured into open polyethylene molds. After 2 days at room temperature a highly elastic but slightly tacky rubber was formed.

EXAMPLE 26

100 parts of the 99 to 1 copolymer of methoxyethyl acrylate and acrylic acid of preparation IV–A above and 6 parts of N,N'-bis-1,2-ethylenisosebacamide are mixed thoroughly and the mixture is poured into open molds and allowed to cure for 28½ hours at 65° C. The resulting rubber has a Gehman $T_{10}$ temperature of $-18°$ F. and a brittle point of from $-25$ to $-29°$ F.

EXAMPLE 27

About 100 parts of a 90:10 liquid copolymer of butadiene and acrylic acid similar to the copolymer of preparation IV–B above and 8.5 parts of N,N'-bis-1,2-ethylenterephthalamide are mixed thoroughly with heating until solution is complete. The resulting liquid is cured for 10 minutes at 350° F. to form a soft, slightly tacky rubber.

EXAMPLE 28

About 100 parts of the 90:10 liquid copolymer of butadiene and acrylic acid of the previous example are mixed with 11 parts of N,N'-bis-1,2-butylenterephthalamide until solution is complete. The resulting liquid is cured for 10 minutes at 350° F. to form a somewhat soft, tacky rubber.

EXAMPLE 29

17 parts of a terpolymer of butadiene, acrylonitrile and an acrylic-type acid (Hycar 1300 X–2, a product of B. F. Goodrich Company) and 4.25 parts of N,N'-bis-1,2-ethylenisosebacamide are mixed thoroughly and the mixture is poured onto open polyethylene molds. After 2 days at room temperature a soft rubber was formed.

EVALUATION

Original mechanical properties:
  Gehman $T_{10}$, ° C. _____ $-26$
  Brittle point, ° C. _____ $-28$ to $-31$
Percent volume swelling after 48 hours at 77° F. submerged in the following liquids:
  70% isooctane:30% toluene _____ 31
  Acetone _____ 137
Percent volume swelling after 70 hours at 212° F. submerged in the following liquids:
  Water _____ 23
  ASTM Reference Oil No. 3 _____ 7

EXAMPLE 30

Monomeric 5-cyano-3-thiapentyl acrylate is prepared as follows: The sodium derivative of 187.4 parts of 2-mercaptoethanol is reacted with 214.8 parts of beta-chloropropionitrile in the presence of 1000 parts of ethanol. The precipitate is then removed from the crude alkanol intermediate followed by vacuum distillation, the fraction boiling at 110–112° C. at a pressure of about 0.2 mm. of mercury being retained. The acrylate monomer is then prepared by adding dropwise a solution of 143.2 parts of freshly distilled acrylyl chloride, dissolved in about twice its volume of benzene, to a cooled flask containing 196.8 parts of the clear colorless purified alkanol, 167 parts of triethylamine and approximately 1500 parts of benzene. After filtration, the filtrate is washed and dried followed by purification of the crude product through distillation at 0.5 mm. mercury pressure. About 214 grams of the colorless clear 5-cyano-3-thiapentyl acrylate boiling at 118–121° C. at about 0.5 mm. mercury pressure are recovered.

A 99 to 1 copolymer of 5-cyano-3-thiapentyl acrylate and acrylic acid is prepared according to the procedure of VII–A above and 100 parts of this copolymer are mixed thoroughly with 6 parts of N,N'-bis-1,2-ethylenisosebacamide and the mixture is poured into an open mold and allowed to cure at room temperature. After two days the mixture is essentially tack-free, and after seven days a soft markedly fuel-resistant rubber has formed.

EVALUATION

Percent volume swelling after being submerged
in the following liquid:                          Percent
  Water—after being submerged 70 hours at
    212° F. _____ 27.7
  70% isooctane, 30% toluene—after being submerged 48 hours at 140° F. _____ 4.5

The volume-swelling data in the isooctane-toluene liquid is considerably better than data obtained with similarly treated polysulfide systems.

EXAMPLE 31

An acid-terminated neopentyl n-sebacate polyester having an acid number of 38.6, an average molecular weight of 2600 and for which the calculated average number of free carboxyl groups per molecule is 3.2 is prepared according to the general procedure of I–C above. A solution of 12.8 parts of N,N'-bis-1,2-ethylenisophthalamide in about 50 parts of acetone is mixed with 100 parts of the polyester and 15 parts of a silica filler (Cabosil, a product of Godfrey L. Cabot, Inc.), is added. The resulting mixture, which is designated lot A, is diluted to approximately 50% solids with toluene.

An acid-terminated neopentyl n-sebacate/isophthalate polyester is prepared according to the same general procedure. This polyester, in which the mole ratio of the acids used is 90 sebacic acid to 10 of isophthalic acid, has an acid number of 38.9. A solution of 12.0 parts of N,N'-bis-1,2-ethylenisophthalamide in about 50 parts of acetone is mixed with 100 parts of the polyester.

The resulting mixture, which is designated lot B, is diluted to approximately 50% solids with toluene.

Resin mixtures lots A and B are used to coat lengths of untreated glass fabric which had been previously heated to further clean its surface. The excess of resin is removed, in each case, by pulling the coated fabric between the nip of two rolls. The lots of coated fabric are then allowed to stand at room temperature until the volatile solvents have evaporated and are then cured for 10 minutes at 350° F.

An alternate and equally satisfactory method of preparing the foregoing resin mixtures is by milling the respective bis-amide and polyester ingredients together at room temperature in a paint mill until the former has dissolved in the latter. Fillers can then be added (as in lot A). The resulting 100% solids-forming liquid mixtures can then be conveniently coated on the glass fabric. This method, in which no solvents are used, is preferred in cases in which solvents may be undesirable, e.g. because of inconvenience of removal, hazard, etc.

The following data is obtained from electrical tests run on the above-described lots of coated glass fabric, which are given the same designations as the resin mixtures from which they are prepared. The tests are run using a 100 cycle per second alternating current.

|  | Lot A | Lot B |
| --- | --- | --- |
| DISSIPATION FACTOR (D) | | |
| (ASTM-D-150-54T): | | |
| 30° C | 0.019 | 0.034 |
| 60° C | 0.026 | 0.057 |
| 90° C | 0.292 | 0.218 |
| DIELECTRIC CONSTANT (K) | | |
| (ASTM-D-150-54T): | | |
| 30° C | 4.5 | 4.2 |
| 60° C | 3.9 | 4.1 |
| 90° C | 3.2 | 4.4 |

The product of the dielectric constant (K) and the dissipation factor (D) is a relative measure of the heat loss accompanying the passage of electrical current. This product and the individual values of (K) and (D) are important in determining whether a material is valuable for use in the electrical insulation field, low values of K, D and of the product of K and D being desired. Materials with dissipation factors in the range of lots A and B are generally useful in the field of electrical insulation.

In addition to having highly useful electrical properties, these coated fabrics have been found to have excellent resistance to continuously high temperatures and to continuous mechanical flexing. This particular combination of properties renders such coated fabrics extremely useful in electrical insulating tapes, e.g. for use in electric motors, etc. Similarly, if the fabric upon which the resin is coated is in the form of a sleeve (i.e. of circular cross section), it may be used in its coated form as an insulation for electrical cables.

The terms and expressions which have been employed are used as terms of description and not of limitation, and it is not intended, in the use of such terms and expressions, to exclude any equivalents of the feature shown and described or portions thereof, but it is recognized that various modifications are possible within the scope of the invention claimed.

What is claimed is:

1. A process for curing a carboxyl-containing polymer which comprises admixing an uncured, aliphatically saturated, substantially completely condensed, polymeric polyester of a polyhydric alcohol reactant and an acidic reactant selected from the group consisting of polycarboxylic acids and polycarboxylic anhydrides at least one of said reactants having at least three functional groups selected from the group consisting of carboxyl group, carboxylic anhydride group and hydroxyl group, said polyester being liquid at about 25° to 50° C., having an acid content in the range of about 0.1 to about 3 milli-equivalents per gram, having a molecular weight not higher than about 10,000, containing an average of more than 2 and not more than 15 carboxyl groups per molecule, and being free from hydroxyl groups, with at least a stoichiometric equivalent of an N,N'-bis-1,2-alkylenamide as a cross-linking agent and curing the admixture at a temperature above 10° C.

2. A self-curing composition comprising an admixture of an uncured, aliphatically saturated, substantially completely condensed, polymeric polyester of a polyhydric alcohol reactant and an acidic reactant selected from the group consisting of polycarboxylic acids and polycarboxylic anhydrides at least one of said reactants having at least three functional groups selected from the group consisting of carboxyl group, carboxylic anhydride group and hydroxyl group, said polyester being liquid at about 25° to about 50° C., having an acid content in the range of about 0.1 to about 3 milli-equivalents per gram, having a molecular weight not higher than about 10,000, containing an average of more than 2 and not more than 15 carboxyl groups per molecule and being free from hydroxyl groups, and at least a stoichiometric equivalent of an N,N'-bis-1,2-alkylenamide as a cross-linking agent.

3. A cured composition comprising in its uncured form, an aliphatically saturated, substantially completely condensed, polymeric polyester of a polyhydric alcohol reactant and an acidic reactant selected from the group consisting of polycarboxylic acids and polycarboxylic anhydrides at least one of said reactants having at least three functional groups selected from the group consisting of carboxyl group, carboxylic anhydride group and hydroxyl group, said polyester being liquid at about 25° to about 50° C., having an acid content in the range of about 0.1 to about 3 milliequivalents per gram, having a molecular weight not higher than about 10,000, containing an average of more than 2 and not more than 15 carboxyl groups per molecule and being free from hydroxyl groups, cured with at least a stoichiometric equivalent of an N,N'-bis-1,2-alkylenamide as a cross-linking agent at a temperature above 10° C.

4. A polymer comprising a carboxyl-terminated, aliphatically saturated, substantially completely condensed, polymeric polyester of a polyhydric alcohol reactant and an acidic reactant selected from the group consisting of polycarboxylic acids and polycarboxylic anhydrides at least one of said reactants having at least three functional groups selected from the group consisting of carboxyl group, carboxylic anhydride group and hydroxyl group, cured at a temperature above 10° C. with at least a stoichiometric equivalent of an N,N'-bis-1,2-alkylenamide represented by the formula:

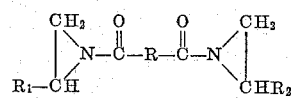

wherein R represents a member of the group consisting of alkylene radicals having from 6 to 18 carbon atoms, a 1,3-phenylene radical and a 1,4-phenylene radical, and $R_1$ and $R_2$ represent a member of the group consisting of hydrogen and lower alkyl radicals; said polyester being liquid at about 25° to about 50° C., having an acid content in the range of about 0.25 to about 1.5 milliequivalents per gram, having a molecular weight not higher than about 10,000, containing an average of about 2.5 to 15 carboxyl groups per molecule and being free from hydroxyl groups.

5. A polymer comprising a carboxyl-terminated, aliphatically saturated, substantially completely condensed, anhydride-extended polymeric polyether ester of a hydroxyl terminated polyether of butylene oxide and pyromellitic dianhydride cured at a temperature above 10° C. with at least a stoichiometric equivalent of an N,N'-bis-1,2-alkylenamide represented by the formula:

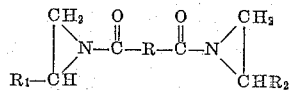

wherein R represents a member of the group consisting of alkylene radicals having from 6 to 18 carbon atoms, a 1,3-phenylene radical and a 1,4-phenylene radical, and $R_1$ and $R_2$ represent a member of the group consisting of hydrogen and lower alkyl radicals; said polyether ester being liquid at about 25° to about 50° C., having an acid content in the range of about 0.25 to about 1.5 milliequivalents per gram, having a molecular weight not higher than about 10,000, containing an average of from about 2.5 to 15 carboxyl groups per molecule and being free from hydroxyl groups.

6. A polymer comprising a substantially completely condensed adipic acid-diethylene glycol-trimethylol propane copolyester, said copolyester being liquid at about 25° to about 50° C., having an acid content of about 1 milliequivalent per gram, having a molecular weight not higher than about 10,000, containing an average of about 3 carboxyl groups per molecule and being free from hydroxyl groups, cured at a temperature above 10° C. with at least a stoichiometric equivalent of an N,N'-bis-1,2-alkylenamide represented by the formula:

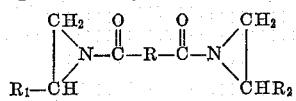

wherein R represents a member of the group consisting of alkylene radicals having from 6 to 18 carbon atoms, a 1,3-phenylene radical and a 1,4-phenylene radical, and $R_1$ and $R_2$ represent a member of the group consisting of hydrogen and lower alkyl radicals.

7. A polymer comprising a saturated, substantially completely condensed polyether ester of succinic anhydride and of a hydroxyl-terminated polyether of glycerine, ethylene oxide and propylene oxide, said polyether ester being liquid at about 25° to about 50° C., having an average acid content of about 1.25 milliequivalents per gram, having a molecular weight not higher than about 10,000, containing an average of about 4 carboxyl groups per molecule and being free from hydroxyl groups, cured at a temeprature above 10° C. with at least a stoichiometric equivalent of an N,N'-bis-1,2-alkylenamide represented by the formula:

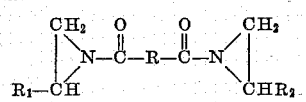

wherein R represents a member of the group consisting of alkylene radicals having from 6 to 18 carbon atoms, a 1,3-phenylene radical and a 1,4-phenylene radical, and $R_1$ and $R_2$ represent a member of the group consisting of hydrogen and lower alkyl radicals.

8. As an article of manufacture, fabric treated with a polymer comprising a carboxyl-containing, aliphatically saturated, substantially completely condensed, polymeric polyester of a polyhydric alcohol reactant and an acidic reactant selected from the group consisting of polycarboxylic acids and polycarboxylic anhydrides at least one of said reactants having at least three functional groups selected from the group consisting of carboxyl group, carboxylic anhydride group and hydroxyl group, cured at a temperature above 10° C. with at least a stoichiometric equivalent of an N,N'-bis-1,2-alkylenamide represented by the formula:

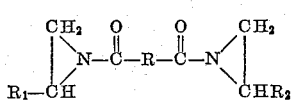

wherein R represents a member of the group consisting of alkylene radicals having from 6 to 18 carbon atoms, a 1,3-phenylene radical and a 1,4-phenylene radical, and $R_1$ and $R_2$ represent a member of the group consisting of hydrogen and lower alkyl radicals; said polyester being liquid at about 25° to about 50° C., having an acid content in the range of about 0.25 to about 1.5 milliequivalents per gram, having a molecular weight not higher than about 10,000, containing an average of from about 2.5 to 15 carboxyl groups per molecule and being free from hydroxyl groups.

9. As an article of manufacture, a fabric treated with a polymer comprising a substantially completely condensed adipic acid-diethylene glycol-trimethylolpropane copolyester, said copolyester being liquid at about 25° to about 50° C., having an acid content of about 0.7 to about 1.5 milliequivalents per gram, having a molecular weight not higher than about 10,000, containing an average of about 3 carboxyl groups per molecule and being free from hydroxyl groups, cured at a temperature above 10° C. with at least a stoichiometric equivalent of an N,N'-bis-1,2-alkylenamide represented by the formula:

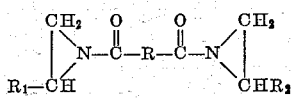

wherein R represents a member of the group consisting of alkylene radicals having from 6 to 18 carbon atoms, a 1,3-phenylene radical and a 1,4-phenylene radical, and $R_1$ and $R_2$ represent a member of the group consisting of hydrogen and lower alkyl radicals.

10. As an article of manufacture, a fabric treated with a polymer comprising a substantially completely condensed adipic acid-diethylene glycol-trimethylolpropane copolyester, said copolyester being liquid at about 25° to about 50° C., having an average acid content of about 1 milliequivalent per gram having a molecular weight of about 5000 and containing an average of about 3 carboxyl groups per molecule and being free from hydroxyl groups, cured with at least a stoichiometric equivalent of an N,N'-bis-1,2-ethylenisosebacamide at a temperature above 10° C.

11. As an article of manufacture, a self-curing heat-resistant elastomeric sealant composition comprising, in admixture, a carboxyl-containing, aliphatically saturated, substantially completely condensed, polymeric polyester of a polyhydric alcohol reactant and an acidic reactant selected from the group consisting of polycarboxylic acids and polycarboxylic anhydrides at least one of said reactants having at least three functional groups selected from the group consisting of carboxyl group, carboxylic anhydride group and hydroxyl group, and an amount at least about equivalent to the carboxyl group of the prepolymer of an N,N'-bis-1,2-alkylenamide represented by the formula:

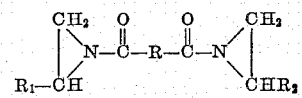

wherein R represents a member of the group consisting of alkylene radicals having from 6 to 18 carbon atoms, a 1,3-phenylene radical and a 1,4-phenylene radical, and $R_1$ and $R_2$ represent a member of the group consisting of hydrogen and lower alkyl radicals; said polyester being liquid at about 25° to about 50° C., having an acid content in the range of about 0.1 to about 3 milliequivalents per gram, having a molecular weight not higher than about 10,000, containing an average of more than 2 and not more than 15 carboxyl groups per molecule, and being free from hydroxyl groups.

12. As an article of manufacture, a self-curing heat-resistant elastomeric sealant comprising, in admixture, a filler, a substantially completely condensed adipic acid-diethylene glycol-trimethylol propane copolyester, said copolyester being liquid at about 25° to about 50° C., having an acid content of about 0.5 milliequivalent per gram, having a molecular weight not higher than about 10,000, containing an average of about 2.6 carboxyl groups per molecule and being free from hydroxyl groups, and N,N'-bis-1,2-ethylenisosebacamide in amount at least about equivalent to the carboxyl groups of the said polyester.

13. As an article of manufacture, an initially porous fibrous web material treated with a polymer comprising a carboxyl-containing, aliphatically saturated, substantially completely condensed, polymeric polyester of a polyhydric alcohol reactant and an acidic reactant selected from the group consisting of polycarboxylic acids and polycarboxylic anhydrides at least one of said reactants having at least three functional groups selected from the group consisting of carboxyl group, carboxylic anhydride group and hydroxyl group, cured at a temperature above 10° C. with at least a stoichiometric equivalent of an N,N'-bis-1,2-alkylenamide represented by the formula:

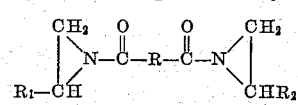

wherein R represents a member of the group consisting of alkylene radicals having from 6 to 18 carbon atoms, a 1,3-phenylene radical and a 1,4-phenylene radical, and $R_1$ and $R_2$ represent a member of the group consisting of hydrogen and lower alkyl radicals; said polyester being liquid at about 25° to about 50° C., having an acid content in the range of about 0.1 to about 3 milliequivalents per gram, having a molecular weight not higher than about 10,000, containing an average of more than 2 and not more than 15 carboxyl groups per molecule and being free from hydroxyl groups.

References Cited by the Examiner
UNITED STATES PATENTS

| | | | |
|---|---|---|---|
| 2,422,356 | 6/47 | Lasher | 260—75 |
| 2,562,878 | 8/51 | Blair | 260—75 |
| 2,594,145 | 4/52 | Flory | 260—75 |
| 2,683,131 | 7/54 | Cass | 260—75 |
| 2,694,696 | 11/54 | Melamed | 260—75 |
| 2,933,416 | 4/60 | Haakh et al. | 260—849 |
| 2,974,116 | 3/61 | Parker et al. | 260—75 |

FOREIGN PATENTS 900,137 12/53 Germany.

WILLIAM H. SHORT, *Primary Examiner.*

MILTON STERMAN, P. E. MANGAN, H. N. BURSTEIN, *Examiners.*